A. Skaats, Jr.
Making Gear Wheels.
N° 42,605.      Patented May 3, 1864.
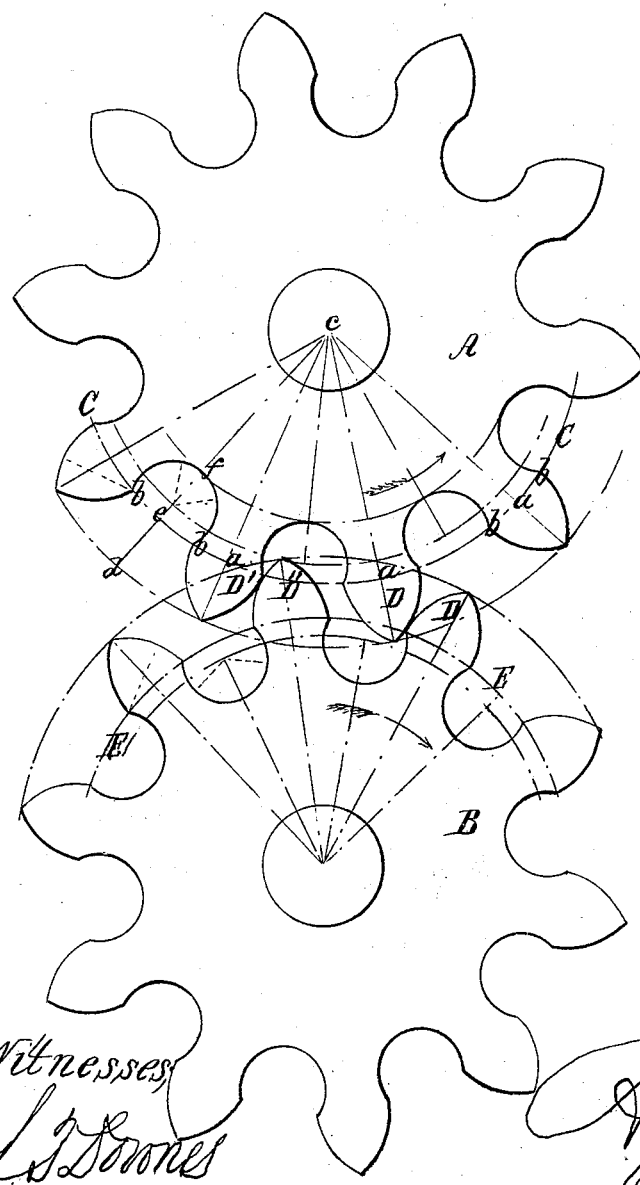
Witnesses
L. S. Downes
J. L. Coombs
Inventor;
A. Skaats Jr
by E. L. Pollok
his atty

UNITED STATES PATENT OFFICE.

ABRAHAM SKAATS, JR., OF NEW HAVEN, CONNECTICUT.

IMPROVEMENT IN CONSTRUCTION OF COG-WHEELS.

Specification forming part of Letters Patent No. 42,605, dated May 3, 1864.

*To all whom it may concern:*

Be it known that I, A. SKAATS, Jr., of New Haven, in the county of New Haven and State of Connecticut, have invented certain new and useful Improvements in the Construction of Toothed or Cog Wheels; and I hereby declare that the following is a full, clear, and exact description of the same.

My invention relates to gear-wheels of machines in which the relative positions of the shafts of the wheels are changed during the operation of the machine—such, for instance, as is the case in clothes-wringers; and it consists in so shaping the teeth or cogs of the gear-wheels that they shall operate in such manner that no motion shall be lost by the surfaces of the teeth or cogs coming out of contact or by undue friction between them; also, that the teeth of one wheel shall press in a direction perpendicular to the radius of the other wheel, although the axles or shafts of the two wheels may within certain limits converge or diverge while the machine is in operation. The shape of teeth or cogs of ordinary gear-wheels is laid down by various geometrical rules, and no explanation respecting them is herein considered necessary; but gear-wheels constructed according to the methods heretofore understood and practiced are applicable only to machinery in which the centers of the wheels in gear are stationary in relation to each other; the adaptation of such cog-wheels to machinery in which the axles or shafts are liable to approach each other or to move apart, as is the case in wringing-machines, there will be undue slip on the one hand and want of continuity of motion in the follower on the other.

In shaping the teeth or cogs of wheels whose centers are calculated to yield in the operation of the machine, the working depth should be made to correspond to the limit of motion of the wheel-centers, and the sides of the teeth or cogs should be of such curvature as that there shall be perfect gear—*i. e*, continuous rolling contact within the limits in which the centers yield. After numerous experiments, I have succeeded in producing a gear which will answer this purpose.

In the drawings, A represents the driving-wheel or driver; B, the driven wheel or follower; and C, the pitch line of wheel A, which is subdivided into a given number of equal parts to correspond to the number of teeth or cogs of the wheel. The radii drawn through the points of division and intersecting the pitch-line C will determine the centers $a$ and center lines, $c\,a$, of the cogs. I then divide the distance from center $a$ to center $a$ along the pitch-line in four parts, equal or nearly so. The two middle divisions, which may be a little larger than the others, will then constitute the breadth of space $b\,e\,b$, and also determine the extreme thickness of the teeth $b\,a\,b$. Now, the points $b$ as centers, I trace arcs of a circle, having for radius the distance $b\,a\,b$, and this will give the shape of the side of the tooth which comes in contact with the teeth of the follower.

The form of space between the teeth is determined in the following manner: I draw radius $c\,d$, make $e\,f$ equal to $d\,e$, then draw a circle through the points $b\,f\,d$.

I have ascertained by experiments that the diameter and pitch-line of the driving-wheel should be a trifle larger than those of the follower or driven wheel to operate with requisite accuracy. The diameter of the pitch-line E of the wheel B being thus determined and the construction or shaping of the teeth or cogs being the same as that of the driving-wheel A, the teeth of the former will be a trifle smaller than those of the latter. By thus constructing or shaping the teeth or cogs of gear-wheels no motion is lost by slip or otherwise, the surfaces in contact have a rolling rather than a frictional contact, and the action of one tooth or cog upon the other is normal—that is to say, perpendicular to a plane tangent common to both surfaces in contact—and this will be so whatever may be the relative position within certain limits of the wheel-centers. The drawings illustrate this action. It will be seen that before the teeth D come out of gear the tooth D' has commenced to act on tooth D''. The action of one wheel upon the other is therefore continuous. The circular space $b\,f\,b$ affords the room necessary for the teeth to move unrestrained when the wheels are brought close together, and the curved sides of the cogs are such that a rolling-gear is effected irrespective of the relative positions of the shafts.

Having thus fully described the nature of my invention, what I claim herein as new, and desire to secure by Letters Patent, is—

Constructing the teeth or cogs of gear-wheels substantially as described, so that without undue friction continuity of action of one wheel upon the other shall be effected irrespective of their relative position within the limits determined by the depth of teeth or cogs.

In testimony whereof I have signed my name to this specification before two subscribing witnesses.

ABRAHAM SKAATS, Jr.

Witnesses:
FRANCIS WAYLAND, Jr.,
JNO. S. BEACH.